(12) United States Patent
Hosking

(10) Patent No.: US 10,581,529 B2
(45) Date of Patent: *Mar. 3, 2020

(54) RAPID OUT-OF-BAND SIGNAL COMMUNICATION IN OPTICAL COMPONENTS

(71) Applicant: FINISAR CORPORATION, Sunnyvale, CA (US)

(72) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,139

(22) Filed: Feb. 6, 2018

(65) Prior Publication Data
US 2019/0068290 A1    Feb. 28, 2019

Related U.S. Application Data

(63) Continuation of application No. 14/517,021, filed on Oct. 17, 2014, now Pat. No. 9,887,782.

(60) Provisional application No. 61/892,910, filed on Oct. 18, 2013.

(51) Int. Cl.
*H04B 10/54* (2013.01)
*H04B 10/564* (2013.01)
*H04B 10/80* (2013.01)

(52) U.S. Cl.
CPC .......... *H04B 10/564* (2013.01); *H04B 10/54* (2013.01); *H04B 10/801* (2013.01)

(58) Field of Classification Search
CPC ............................. H04B 10/54; H04B 10/541
See application file for complete search history.

(56) References Cited

U.S. PATENT DOCUMENTS

| | | | |
|---|---|---|---|
| 6,971,805 B1 * | 12/2005 | Linnell | H04J 14/00 385/88 |
| 9,887,782 B2 * | 2/2018 | Hosking | H04B 10/564 |
| 2003/0048976 A1 * | 3/2003 | Lundqvist | H01S 5/0265 385/14 |
| 2005/0232643 A1 * | 10/2005 | Aronson | H04B 10/40 398/183 |
| 2006/0008203 A1 * | 1/2006 | Maeda | B82Y 20/00 385/27 |

(Continued)

*Primary Examiner* — Nathan M Cors
(74) *Attorney, Agent, or Firm* — Maschoff Brennan

(57) ABSTRACT

An example embodiment includes an optoelectronic module. The optoelectronic module may be configured to transmit out-of-band (OOB) data as an average optical power difference between optical signals. The optoelectronic module may include a first optical source, a second optical source, and an optical power control device. The first optical source may be configured to generate a first optical signal including first channel payload data on a first optical channel. The second optical source may be configured to generate a second optical signal including second channel payload data on a second optical channel. The optical power control device may be configured to vary average optical powers of one or more of the first optical signal and the second optical signal to create an average optical power difference between the first optical signal and the second optical signal that is representative of a logical bit of the OOB data.

19 Claims, 9 Drawing Sheets

(56) References Cited

U.S. PATENT DOCUMENTS

| | | | |
|---|---|---|---|
| 2006/0171393 A1* | 8/2006 | Lin | H04L 45/62 370/392 |
| 2008/0247755 A1* | 10/2008 | Hinderthur | H04J 14/02 398/58 |
| 2010/0054733 A1* | 3/2010 | Hosking | H04B 10/0779 398/25 |
| 2014/0079390 A1* | 3/2014 | Kim | H04B 10/0773 398/30 |

* cited by examiner

RAPID OUT-OF-BAND SIGNAL COMMUNICATION IN OPTICAL COMPONENTS

CROSS-REFERENCE TO RELATED APPLICATIONS

This application is a Continuation of U.S. patent application Ser. No. 14/517,021, filed Oct. 17, 2014, titled RAPID OUT-OF-BAND SIGNAL COMMUNICATION IN OPTICAL COMPONENTS, which claims priority to U.S. Provisional Application No. 61/892,910, filed Oct. 18, 2013, titled RAPID OUT-OF-BAND SIGNAL COMMUNICATION IN OPTICAL COMPONENTS, all of which are incorporated herein by reference in their entireties.

FIELD

The embodiments discussed herein are related to communication of out-of-band signals in optical communication components.

BACKGROUND

Peripheral component interconnect express (PCIe) communication links include short serial communication links, which may be used to connect peripheral devices to a computer or to connect servers, for example. PCIe communication links generally conform to a PCIe standard, which establishes a standard layout for a PCIe standard bus and correspondingly a PCIe connector that may be included in peripheral devices. The PCIe standard is used throughout the computer industry and provides interchangeability of peripheral devices as well as establishes design criteria used in the development of peripheral devices.

Specifically, the PCIe standard designates certain channels in a PCIe standard bus for communication of payload data and other channels in the PCIe standard bus for communication of status data. The payload data may include general data used in applications and the status data may include data rate negotiation, the presence or readiness of a peripheral device, and the like.

According to the PCIe standard, the data (payload data and/or status data) may be communicated on payload data channels, which may be configured into groups of four lanes or multiples of four lanes. The lanes are generally constructed using copper components. However, the copper components limit signaling speeds and limit distances over which the data may be communicated. Moreover, recent developments in the PCIe standard seek to increase the payload data speeds and users are seeking longer distances for physically larger systems.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below. This Summary is not intended to identify key features of the claimed subject matter, nor is it intended to be used as an aid in determining the scope of the claimed subject matter.

An example embodiment includes an optoelectronic module. The optoelectronic module may be configured to transmit out-of-band (OOB) data as an average optical power difference between optical signals. The optoelectronic module may include a first optical source, a second optical source, and an optical power control device. The first optical source is configured to generate a first optical signal including first channel payload data on a first optical channel. The second optical source is configured to generate a second optical signal including second channel payload data on a second optical channel. The optical power control device is configured to vary average optical powers of one or more of the first optical signal and the second optical signal to create an average optical power difference between the first optical signal and the second optical signal that is representative of a logical bit of the OOB data.

Another example embodiment may include an optoelectronic module. The optoelectronic module may be configured to OOB data as an average optical power difference between optical signals. The optoelectronic module may include a first optical receiver, a second optical receiver, and an optical power sensing system (sensing system). The first optical receiver may be configured to receive a first optical signal including first channel payload data via a first optical channel. The second optical receiver may be configured to receive a second optical signal including second channel payload data via a second optical channel. The sensing system may be configured to compare average optical powers of the first optical signal and the second optical signal. Additionally, in response to a detection of an optical power difference, the sensing system may be configured to output a logical bit representative of OOB data.

Another example embodiment may include a method of communicating an OOB signal between a host device and a target device. The method may include communicating a first optical signal on a first optical channel of a differential pair of optical channels. The first optical signal may include first optical channel payload data. The method may include communicating a second optical signal on a second optical channel of the differential pair. The second optical signal may include second optical channel payload data. The method may include comparing a first power of the first optical signal to a second power of the second optical signal. The method may include interpreting an optical power difference between the first power and the second power as a logical bit representative of OOB data.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

Figure 1:
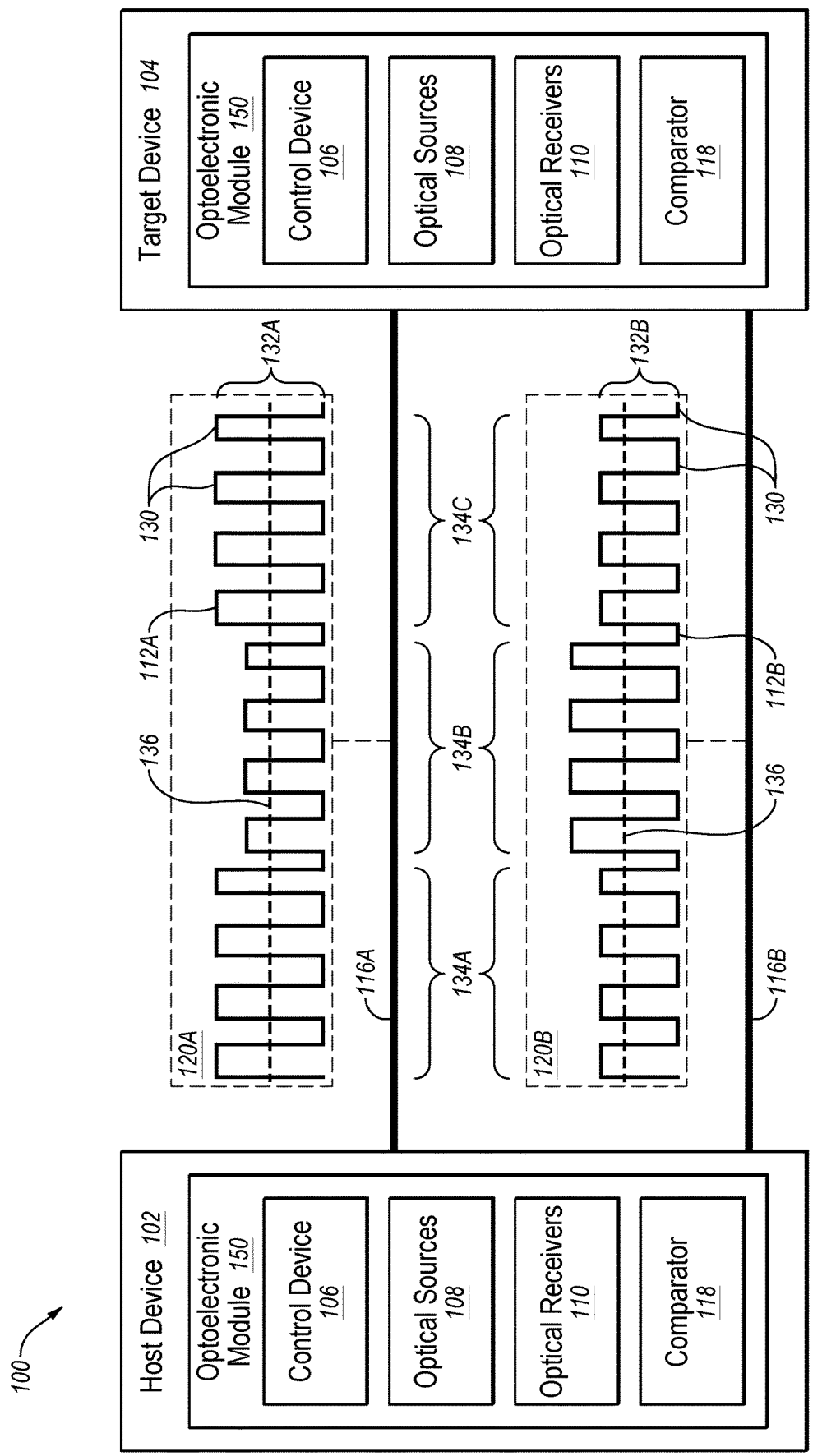
FIG. 1 illustrates a block diagram of an example optical system (system) in which some embodiments may be implemented.

Payload data signals on peripheral component interconnect express (PCIe) links may be carried by differential electrical signals on multiple channels, which may be constructed of copper wires and copper connectors. The multiple channels may be organized into groups of four lanes or multiples of four lanes. Additionally, various upstream (e.g., from a peripheral device to a computer) and downstream (e.g., from a computer to a peripheral device) status data signals on a PCIe link may be communicated via one or more additional copper conductors.

The copper conductors and copper wires limit the speed at which the payload data signals and the status data signals may be communicated. Additionally, copper conductors and copper wires further limit distances over which the payload data signals and the status data signals may be communicated. For example, the copper conductors and copper wires may limit the speed to below about 10 gigabits per second (GB/s) and fewer than a few feet.

To meet demand for higher speeds and/or longer distances, fiber-optic systems may be used for communicating payload data signals. For example, four-lane optoelectronic modules may be used in PCIe links. The optoelectronic modules may meet data transfer speeds of 10 GB/s and may additionally meet speeds exceeding 10 GB/s. For example, four-lane optical transceivers may communicate at rates of about 100 GB/s and/or at multiple or various intermediate rates.

To communicate the status data in addition to payload data in optical systems may present some difficulties. In some optical systems, out-of-band (OOB) signals may be used to communicate status data along optical fibers. For example, a primary data signal, which may have a high data rate and a lower limit on its spectral bandwidth, and a secondary OOB data signal, which may have a lower data rate with a spectral bandwidth that does not interact with the primary data channel, may be carried in an optical signal. The OOB signals may include sideband signals, for example. However, some existing OOB signals may be communicated below speeds customary in systems such as a PCIe system. For example, in some PCIe systems communication speeds have end-to-end latencies on the order of 1 or 2 microseconds (µs) or less Additionally, these optical systems may be implicitly AC coupled. Therefore, optical systems may not transmit a static DC state except by encoding the static DC state within a data stream which is inherently AC coupled. The encoding of the static DC state may require considerable processing before becoming useful, which may preclude use of the optical systems in some environments.

Additionally, in some optical systems, electrical signals corresponding to incident optical power of the photodetector may be complexly processed for other purposes not necessarily associated with the transfer of data from one end to the other of the optical data link. For example, the incident optical power may be converted to a numerical value, scaled, offset, and calibrated numerically, and presented to host equipment as a numerical value at a predetermined memory location for the purpose of providing an indication of received optical power. This process may take tens of milliseconds (ms) or more.

Some embodiments discussed herein relate to communication of OOB signals such as the status signals in PCIe links and other implementations (e.g., quad small form-factor pluggable (qSFP), coaxpress (CXP), and centum form-factor pluggable (CFP) compliant optical systems; multimode fiber-optical systems; multi-fiber-optical systems; wavelength division multiplexed optical systems) via optical signals. An example embodiment may include a multichannel optoelectronic module configured to communicate OOB data encoded in power variations of optical signals communicated on a pair of optical channels designated as a differential pair with respect to the OOB data. Accordingly, the multichannel optoelectronic module may include optical sources configured to communicate optical signals having varying average optical powers. The multichannel optoelectronic module or another multichannel optoelectronic module communicatively coupled to the multichannel optoelectronic module may include optical receivers configured to receive the optical signals on the differential pair and measure the varying optical powers. The optical power differences between the optical signals may be interpreted as OOB data. Multiple optical signals may be paired on which OOB differential signals are communicated to provide additional and/or more complex OOB data.

The multichannel optoelectronic module may be implemented in an active optical cable and/or a peripheral device that substantially complies with the PCIe standard. Additionally, the multichannel optoelectronic module may be implemented in optoelectronic systems that substantially comply with non-PCIe formats including qSFP, CXP, and CFP.

In embodiments implemented for PCIe-compliant devices and cables, the OOB data may be converted to electrical signals. The OOB data may be communicated to copper connectors configured to receive status data on a PCIe link. Additionally or alternatively, the multichannel optoelectronic module may be implemented in a multi-fiber-optical system, a wavelength division multiplexed (WDM) optical system, or another suitable optical system. The multichannel optoelectronic module may communicate OOB data upstream and downstream in the PCIe link and in other suitable optical systems.

The multichannel optoelectronic module may communicate OOB data at rates in the megabit-per-second range, or may communicate singular DC coupled status signals with low latency typical of the PCIe standard. Additionally, communication of the OOB data in the power differences may reduce processing needed to extract meaningful information therefrom. For example, in some existing OOB systems, bits may be communicated every 200 µs. It may take 10 bits to build a byte, which is about 2 ms per byte. There may be about 128 bytes, which equates to about 256 ms plus some overhead allocated for a header and/or a checksum, for example (about another 50 ms) to create a packet. In sum, about ⅓ of a second may be needed to propagate a bit from one end of an existing OOB link to another. This may be too slow for implementations described herein.

The multichannel optoelectronic module, or at least some embodiments thereof, may accordingly, reduce or eliminate firmware or any similar software processing to perform the processing detailed above. The lack of a need to extensively process the OOB data in the optoelectronic module may contribute to the effectiveness of the multichannel optoelectronic module by reducing overall propagation delays and processing delays occurring at the multichannel optoelectronic module. Some additional embodiments are described with reference to the accompanying drawings.

FIG. 1 illustrates a block diagram of an example optical system (system) 100 in which some embodiments described herein may be implemented. The system 100 may be configured to communicate payload data 130 and OOB data between a host device 102 and a target device 104 on a pair of data-carrying optical signals 112A and 112B (generally, optical signal 112 or optical signals 112). Specifically, in a depicted system 100, the optical signals 112 may have varying average optical powers. The OOB data, which may generally include binary and/or logical bits, may be represented by differences or relative differences in the optical powers between the optical signals 112.

Communicating the OOB data as an OOB differential signal pair through the pair of optical signals 112 rather than as a single-ended OOB signal may help to increase the reliability at which OOB data is communicated between the host device 102 and the target device 104. Additionally, interpreting the OOB data from the optical power differences may enable communication of the OOB data using components with simple circuitry and little or no logical processing. Additionally, communicating the OOB data from the optical power differences may enable transmission of static direct current (DC) states.

In the system 100, the host device 102 and the target device 104 may be communicatively coupled via one or more of optical channels 116A and 116B (generally, optical channel 116 or optical channels 116). The optical signals 112 may be communicated along the optical channels 116. The optical channels 116 may include independent optical fibers and/or optical links including one or more optical components (e.g., optical amplifiers, dispersion compensation components, physical optical connectors, etc.). Alternatively, the optical channels 116 may each include a different wavelength channel (or equivalent frequency channel) in a multiplexed optical system.

In FIG. 1, boxes 120A and 120B depict example optical signals 112 communicated along corresponding optical channels 116. Specifically, in the depicted embodiment, a first box 120A corresponds to a first optical channel 116A in which a first optical signal 112A is communicated and a second box 120B corresponds to a second optical channel 116B in which a second optical signal 112B is communicated. In each of the optical signals 112, the payload data 130 is represented by an oscillating binary signal. In FIG. 1, four of the payload data 130 are labeled, two in the first optical signal 112A and two in the second optical signal 112B. The OOB data is represented in the relative optical power differences between the optical signals 112 at corresponding times. For example, an average optical power difference is represented in FIG. 1 by comparing a first optical power 132A of the first optical signal 112A to a second optical power 132B of the second optical signal 112B over time. The first optical power 132A being greater than the second optical power 132B during an OOB data bit period may be interpreted as one logical bit of OOB data, such as a logical one (or a logical zero). On the other hand, the first optical power 132A being less than the second optical power 132B during an OOB data bit period may be interpreted as another logical bit of OOB data, such as a logical zero (or a logical one).

Multichannel optoelectronic modules 150 (generally, optoelectronic module 150 or optoelectronic modules 150) may be included at each of the host device 102 and the target device 104. The optoelectronic modules 150 may be configured to generate, communicate, and/or interpret the optical signals 112. Each of the optoelectronic modules 150 may include an optical power control device (control device) 106, optical sources 108, optical receivers 110, and an optical power sensing system (sensing system) 118.

The optical sources 108 may include any number of suitable optical transmitters, which may each be coupled to one or more components (such as a laser driver) to generate and communicate the optical signals 112 including the OOB data and the payload data 130. Each of the optical sources 108 may include, but is not limited to, a vertical cavity surface-emitting laser (VCSEL), a transmit optical subassembly (TOSA), a Fabry-Perot (FP) laser, a distributed feedback (DFB) laser, an externally modulated (substantially constant power) laser, a laser with managed chirp (examples of which are marketed by FINISAR CORPORATION as CML and CHIRP MANAGED LASER CML), a tunable optical transmitter, dense wavelength-division multiplexed (DWDM) transceivers, a light-emitting diode (LED), and the like.

In some embodiments, the optical sources 108 may include a multiplicity of individual, nominally independent optical transmitters. The optical transmitters may be constructed in close proximity to one another and/or of a common material in the form of an array, for example. Additionally or alternatively, the optical transmitters may be managed and/or controlled by one or more common systems (e.g., the control device 106). Accordingly, in these and other embodiments, drift, aging, and/or temperature effects of the optical transmitters may be similar and may not affect the optical power differences between the optical signals 112 generated by the optical transmitters, although the absolute power of the optical transmitters may change.

In some embodiments, the optoelectronic module 150 may include a first optical source 108A configured to generate the first optical signal 112A and a second optical source 108B configured to generate the second optical signal 112B, and one or more other optical sources 108 configured to generate optical signals including other payload data 130 and/or OOB data.

The optical receivers 110 may include any suitable optical receiver configured to receive the optical signals 112 and at least partially enable a comparison of the optical powers such that interpretation of the optical signals 112 may be performed.

The optical receivers 110 may generate electrical signals representative of the optical signals 112. Specifically, the average optical power may be represented by the bias current drawn by the optical receivers 110. The optical receivers 110 may then communicate the electrical signals to the sensing system 118. Each of the optical receivers 110 may include, but is not limited to, a photodiode, a photodetector diode, an avalanche photodiode, a receiver optical subassembly (ROSA), and a PIN photodiode. In some embodiments, a first of the optical receivers 110 may be configured to receive the first optical signal 112A and a second of the optical receivers 110 may configured to receive the second optical signal 112B. Each of the first and the second of the optical receivers 110 may communicate a signal representative of the average optical powers of the first and second optical signals 112A and 112B to, e.g., the sensing system 118.

In some embodiments, the optical receivers 110 may include a multiplicity of individual, nominally independent optical receivers. The optical receivers 110 may be constructed in close proximity to one another and/or of a common material in the form of an array, for example. Additionally or alternatively, the optical receivers 110 may be managed and/or controlled by one or more common systems. Accordingly, in these and other embodiments, changes to the optical receivers 110 may be similar and may not affect the optical power differences between the optical signals 112 as measured by the optical receivers 110.

Additionally or alternatively, the optical receivers 110 may include or be coupled to one or more components (not shown) that process the electrical signals representative of the optical signals 112. For example, the host device 102 and/or the target device 104 may include a transimpedance amplifier (TIA). In some embodiments of the optical receivers 110, a photodiode may be connected directly to a TIA mounted within a ROSA. The TIA may be mounted in the ROSA or as near to the photodiode as physically possible. Additionally or alternatively, the host device 102 and/or the target device 104 may include a clock and data recovery circuit (CDR), a received optical power sensing system, equalizers for optical dispersion compensation and/or precondition the electrical output waveshape, or any multiples and/or combinations thereof. The received optical power sensing system may include a current mirror and a resistor or any other suitable power sensing system.

Communication of OOB data between the host device 102 and the target device 104 may generally include varying one or more average optical powers of the optical signals 112 at a transmitting device (e.g., the host device 102 or the target device 104). The optical signals 112 having varying optical powers may be communicated to a receiving device (e.g., the other of the host device 102 or the target device 104). The optical power differences of the optical signals 112 may be interpreted at the receiving device as logical bits.

Correlations between the optical power differences and the logical bits may be organized in any suitable way. For example, in some embodiments, when the first optical power 132A is greater than the second optical power 132B, the receiving device may interpret the optical power difference as a logical one and when the second optical power 132B is greater than the first optical power 132A, the receiving device may interpret the optical power difference as a logical zero. The inverse interpretation of the optical power differences may alternately be implemented in some embodiments.

The changes to the first and second optical powers 132A, 132B of the optical signals 112 may be controlled by the control device 106. An example of the control device 106 may include a driver (or multiple drivers) that is communicatively coupled to at least some of the optical sources 108. The driver may be a current driver and may increase or decrease a current provided to the optical sources 108, which may vary the optical power of the optical signals 112.

In some embodiments, the control device 106 may include a digital-to-analog converter (DAC). The DAC may be configured to provide a bias current to one or more of the optical sources 108. When the optoelectronic module 150 is calibrated during manufacturing, one or more numerical values may be determined for the DAC to create one or more corresponding defined optical output powers for each of the optical sources 108. The numerical value(s) determined for the DAC for each of the optical sources 108 may be stored in a non-volatile memory (not shown) and provided to the DAC during operation of the optical sources 108.

Additionally, in some embodiments, the optoelectronic module 150 may also include photodiodes. The photodiodes may be optically coupled to each of the optical sources 108. A laser bias (and accordingly, the optical power) may be controlled by a servo using a response of the photodiode compared against a target value stored in non-volatile memory. Alternatively, a bias current may not be controlled directly. Instead, a servo target value, a feedback value, or a response of the photodiode monitoring the optical sources 108 may be altered in a similar manner in response to the logical level of the OOB data.

Additionally or alternatively, the control device 106 may include a modulator. The modulator may be configured to modulate the optical power of the optical signals 112. The OOB data may be modulated onto the optical signals 112 in these embodiments. The optical receivers 110 may accordingly include an OOB data value decision threshold. The OOB data value decision threshold for each of the optical channels 116 may be set as an individually scaled sample of an average of optical powers of one or more received optical signals 112. An advantage of using the modulator and the OOB data value decision threshold may include an ability to utilize most or all of the optical channels 116 in each direction to communicate OOB data.

For example, in some embodiments, the one or more of the optical sources 108 may include an externally modulated laser. The laser power of the externally modulated laser may remain constant. The transmitted light intensity may be controlled by modulators such as a Mach-Zender external modulator. In these and other embodiments, the OOB data may be similarly mixed with the payload data, but the external modulator is providing the average power differences. The external modulator is not limited to a Mach-Zender external modulator, as other types of modulators may be similarly implemented to electrically vary an attenuation they present to optical signals passing through them. In these and other embodiments, there is a "bias" that sets a range of the attenuation (as similar to average laser power in directly modulated laser systems). A payload data signal may be summed with the bias to produce the normal modulated light output and the OOB data can additionally be summed with the bias to signals representative of the OOB data.

The control device 106 may accordingly vary the optical power of both optical signals 112 as depicted in FIG. 1 or may vary the optical power of one of the optical signals 112. For example, in some embodiments the first optical signal 112A may be held substantially constant average power and the control device 106 may alter the optical power of the second optical signal 112B. While these embodiments may be described as including a signal and a reference, and not a "true differential signal," these embodiments are still described herein as differential due to the difference between the signal and the reference from which the OOB data is interpreted. In the depicted embodiment, two optical channels 116 are depicted as a differential pair with respect to the OOB data. In some other embodiments, the first optical signal 112A may be held to a substantially constant average optical power and one or more other optical channels 116 may carry optical signals that vary in relationship to the first optical signal 112A.

Additionally or alternatively, as shown in FIG. 1, the control device 106 may vary the optical power of both of the optical signals 112, i.e., increase the optical power of the first optical signal 112A and decrease the optical power of the second optical signal 112B or vice versa.

The sensing system 118 may be configured to compare the optical signals 112 to determine whether an optical power difference exists. For example, in some embodiments, the sensing system 118 may receive electrical signals representative of the optical signals 112 and compare voltages or currents of the electrical signals. When an optical power difference exists, the sensing system 118 may additionally determine which of the optical signals 112 includes an optical power that is greater. Specifically, the sensing system 118 may determine whether the first optical power 132A is greater than the second optical power 132B or vice versa, which may be interpreted as a logical bit of the OOB data.

The sensing system 118 may include an analog comparator, which may include hysteresis. The analog comparator may include a positive input connected to an analog signal strength node of one of the optical receivers 110. The analog comparator may also include a negative input connected to an analog signal strength node of the second of the optical receivers 110. The first and the second of the optical receivers 110 may be included in a pair of the optical receivers 110 that are considered a differential pair with respect to the OOB data and, in some embodiments, not with respect to the payload data 130 (e.g., the first and the second of the optical receivers 110 may alternately or additionally generate electrical data signals representing the payload data 130 where the electrical data signals are not processed as a differential pair). An output of the analog comparator may include a logical one when the optical power of the first of the optical receivers 110 is greater than the optical power of the second of the optical receivers 110. Likewise, the output of the analog comparator may include a logical zero when the optical power of the first of the optical receivers 110 is less than the optical power of the second of the optical receivers 110. The output of the analog comparator may then be electrically processed within the optoelectronic module 150 to conform to the specific electrical signaling levels of the receiving device and may be read by the receiving device on a connector pin, for instance.

For example, the system 100 in FIG. 1 may be communicating OOB data from the target device 104 to the host device 102. In this example, the target device 104 may receive OOB data including a logical one, then a logical zero, and then a logical one. In this example, when the first optical signal 112A includes a greater optical power than the second optical signal 112B, the optical power difference may be interpreted as a logical one bit. Conversely, when the second optical power 132B of the second optical signal 112B is greater than the first optical power 132A of the first optical signal 112A, the optical power difference may be interpreted as a logical zero bit.

A first of the optical sources 108 of the optoelectronic module 150 at the target device 104 may accordingly be configured to generate the first optical signal 112A having the first optical power 132A. Additionally, a second of the optical sources 108 of the optoelectronic module 150 at the target device 104 may be configured to generate the second optical signal 112B having the second optical power 132B. During a first duration of time 134A and a third duration of time 134C, the first optical power 132A may be held higher than the second optical power 132B. During a second duration of time 134B, the second optical power 132B may be held higher than the first optical power 132A.

Each of the durations of time 134A-134C are illustrated as equal in length in FIG. 1 and may correspond to an OOB data bit period. More generally, the durations of time 134A-134C may be of the same or different lengths where the length of each of the durations of time 134A-134C may be an integer multiple of the OOB data bit period.

In the host device 102, the first of the optical receivers 110 may be configured to receive the first optical signal 112A and the second of the optical receivers 110 may be configured to receive the second optical signal 112B. The sensing system 118 of the host device 102 may receive and compare electrical signals representative of the first and second optical powers 132A, 132B of the first and second optical signals 112A and 112B. The optical power differences over time between the first and second optical signals 112A and 112B may be interpreted as a series of logical bits of OOB data. Because the first optical power 132A is greater than the second optical power 132B during the first and third durations of time 134A, 134C, the host device 102 may interpret a logical one bit for each of the first and third durations of time 134A, 134C. In contrast, because the second optical power 132B is greater than the first optical power 132A during the second duration of time 134B, the host device 102 may interpret a logical zero bit for the second duration of time 134B.

In the example above, the target device 104 communicates the optical signals 112 to the host device 102. However, communication of the optical signals 112 from the host device 102 to the target device 104 may be performed according to a similar process.

During the communication of the OOB data, the payload data 130 may be communicated between the target device 104 and the host device 102. The optoelectronic module 150 may be configured such that the payload data 130 may not interfere with the OOB data and vice versa. In some embodiments, the optoelectronic module 150 may distinguish the amplitudes of the payload data 130 from the amplitudes the optical power differences representative of the OOB data such that the amplitudes of the payload data 130 may be large compared to the optical power differences. Additionally or alternatively, the optoelectronic module 150 may communicate the payload data 130 at a higher frequency than the optical power differences representative of the OOB data.

For example, the logical level of the payload data 130 may move from significantly less than an average power 136 to significantly more than the average power 136. Accordingly, small changes representing the OOB data may not be significant to detection of the payload data 130 by the optical receivers 110. The amount of the changes representing the OOB data may depend on a particular system 100. In at least some embodiments, a change of about 10% may be implemented in some embodiments which may be detected by the optical receivers 110 but may not interfere with accurate detection of the payload data 130.

Additionally, in some embodiments, the payload data 130 may be scrambled with an encoding scheme that may eliminate long, continuous sequences of logical ones or logical zero values. The absence of continuous sequences may limit interference between the OOB data and the payload data 130 due to infrequency or absence of optical power at lower frequencies. Likewise, the optical receivers 110 may be designed to ignore optical power at lower frequencies. For example, it is common in embodiments in which the payload data 130 is communicated at GB/s data rates that there is negligible energy below several megahertz (MHz).

Additionally, in some embodiments, the changes in optical power representative of the OOB data may slew from one logic state to the other (e.g., from a logical zero to a logical one) in more than about a few hundreds of nanoseconds (ns). For example, the slew from a logical zero to a logical one or vice versa may occur every about 100-500 ns. The slew from one logic state to the other may not repeatedly cycle in less than a few hundreds of ns, thus the optical power associated with the OOB data above a few MHz may be quite low and may not interfere with the payload data 130.

Additionally, in some embodiments the sensing system 118 and some associated circuitry may be configured to not respond to changes more rapid than a few hundreds of ns. Accordingly, the sensing system 118 may ignore or not be affected by the payload data 130.

Embodiments of the system 100 are not limited to the host device 102 and the target device 104. In some systems 100 the optoelectronic modules 150 may be constructed as separate transceiver modules, transmitter modules, receiver modules, or active optical cables including one or more of a transceiver module, a transmitter module, and a receiver module. The modules may be permanently installed with fiber cables or separable connectors to the optical channels 116. Some optoelectronic modules 150 or systems included in the modules may be constructed by co-mounting one or more components (e.g., 106, 108, 110, and 118) with other computing devices and ICs to achieve miniaturization.

In the system 100, communication of the OOB data may be interpreted according to any suitable protocol. In some embodiments, the protocol may be configured to operate with OOB data communicated on the order of 1 MHz, but with no significantly higher frequency components. For instance, several different data and encoding formats may be used to communicate the OOB data from one device (e.g., 102 and/or 104) to the other. Each pair of optical channels may be differentially modulated as described herein with its own data stream of OOB data, and each data stream may use a different protocol without prearrangement with the manufacturer. Additionally or alternatively, an inter-host protocol for the OOB data exchange may be established that presents no burden on the optoelectronic module 150 or transmission of the payload data 130.

Figure 2:
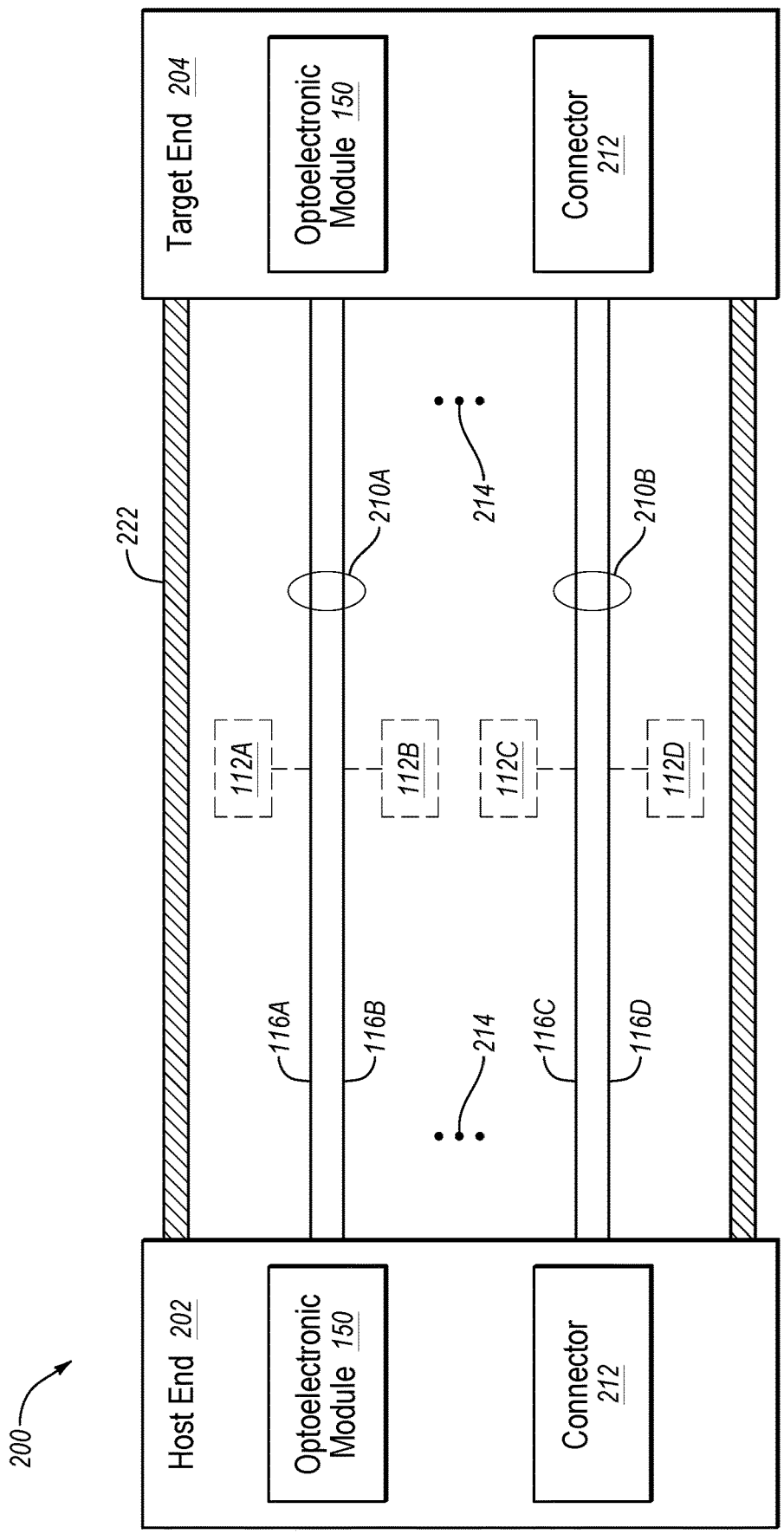
FIG. 2 illustrates an example active optical cable implementing an optoelectronic module that may be included in the system of FIG. 1.

FIG. 2 illustrates an example active optical cable (active cable) 200 implementing two of the optoelectronic modules 150 of FIG. 1. The active cable 200 may include a host end 202 and a target end 204, which may be configured to be selectively connected to a host device and a target device such as the host device 102 and the target device 104 of FIG. 1. The active cable 200 may be further configured to communicate the optical signals 112—including the optical signals 112A and 112B of FIG. 1 and additionally including optical signals 112C and 112D—between the host end 202 and the target end 204. The optical signals 112 may represent payload data and OOB data that are communicated between the host end 202 and the target end 204.

At each of the host end 202 and the target end 204, the active cable 200 may include the optoelectronic module 150 of FIG. 1. The optoelectronic module 150 may generate, communicate, and interpret the optical signals 112 including the OOB data and the payload data.

Between the host end 202 and the target end 204, the active cable 200 may include one or more of the optical channels 116 of FIG. 1. In FIG. 2, the optical channels 116 include optical channels 116A-116D. Subsets of the optical channels 116 may be designated as differential pairs 210A and 210B (generally, differential pair 210 or differential pairs 210) with respect to the OOB data. Accordingly, power levels of the optical signals 112 communicated along each of the optical channels 116 in the differential pairs 210 may be compared and OOB data may be interpreted therefrom. The differential pairs 210 or a combination of the differential pairs 210 may be referred to as lanes in some embodiments. FIG. 2 depicts two differential pairs 210 each including two optical channels 116. However, in some alternative examples the active cable 200 may include more than two differential pairs 210 in which two or more optical channels 116 may be included.

For example, the first optical signal 112A communicated in the first optical channel 116A in a first differential pair 210A may be compared to the second optical signal 112B in the second optical channel 116B in the first differential pair 210A. Thus, an optical power difference measured between the first optical signal 112A communicated via the first optical channel 116A and the second optical signal 112B communicated via the second optical channel 116B may be interpreted as a logical bit of OOB data. Likewise, an optical power difference measured in a second differential pair 210B, between a third optical signal 112C and a fourth optical signal 112D may be interpreted as a logical bit of OOB data.

In some embodiments, the differential pairs 210 may be related to one another. For example, the first differential pair 210A and the second differential pair 210B may be related. Thus, a two logical bit signal (e.g., 10, 01, 00, or 11) may be communicated by the two related differential pairs 210. More complex signals may be communicated between the host end 202 and the target end 204 by relating more of the differential pairs 210. For example, a three logical bit signal (e.g., 000, 001, 011, etc.) may be communicated between the host end 202 and the target end 204 by relating three differential pairs 210. In embodiments in which the active cable 200 is configured to communicate operational data such as bit rate negotiations, temperature trends, and operational status, one or more two logical bit signals, each including two related differential pairs 210, may be used.

Additionally, in this and other embodiments, the active cable 200 may include a jacket 222. A sectional view of the jacket 222 is depicted in FIG. 2. The differential pairs 210 may be surrounded by the jacket 222. The jacket 222 may protect and/or provide support for the differential pairs 210.

In some embodiments, the ends 202 and 204 of the active cable 200 may each include connectors 212. The connectors 212 may include copper pins or other suitable electrical or optical connectors configured to contact one or more corresponding structures at the host device and/or at the target device. In embodiments including the connectors 212, electrical signals representing payload data and/or OOB data may be communicated with the active cable 200 via the connectors 212. For example, when communicating payload data and OOB data from a target device to a host device, electrical signals representing the payload data and/or the OOB data may be communicated from the target device to the target end 204 via the connectors 212. The electrical signals may be converted to optical signals by the optoelectronic module 150 at the target end 204. Specifically, the optoelectronic module 150 may generate the first and second optical signals 112A and 112B that may be communicated along the first and second optical channels 116A and 116B. Each of the first and second optical signals 112A and 112B may individually represent a different portion, e.g., a different half, of the OOB data transmitted from the target end 204 to the host end 202. The first and second optical signals 112A and 112B in combination may also include optical power differences representing the OOB data. The optoelectronic module 150 at the host end 202 may receive the first and second optical signals 112A and 112B and may separate the payload data from the OOB data. The payload data may be converted to electrical signals and may be communicated to the host device via the connectors 212 of the host end 202. The optical powers of the first and second optical signals 112A and 112B may be compared in the optoelectronic module 150 to determine the optical power differences and the logical bits of OOB data that the optical power differences represent. The optoelectronic module 150 in the host end 202 may then communicate an electrical signal representative of the logical bits of OOB data to the host device via the connectors 212 included in the host end 202. In an analogous manner, payload data and/or OOB data may be communicated in the other direction, e.g., from the host device to the target device.

Modifications, additions, or omissions may be made to the embodiment of FIG. 2 without departing from the scope of the present disclosure. For instance, although two differential pairs 210 are illustrated in FIG. 2, there may be more than two differential pairs 210 as denoted by ellipses 214.

Figure 3:
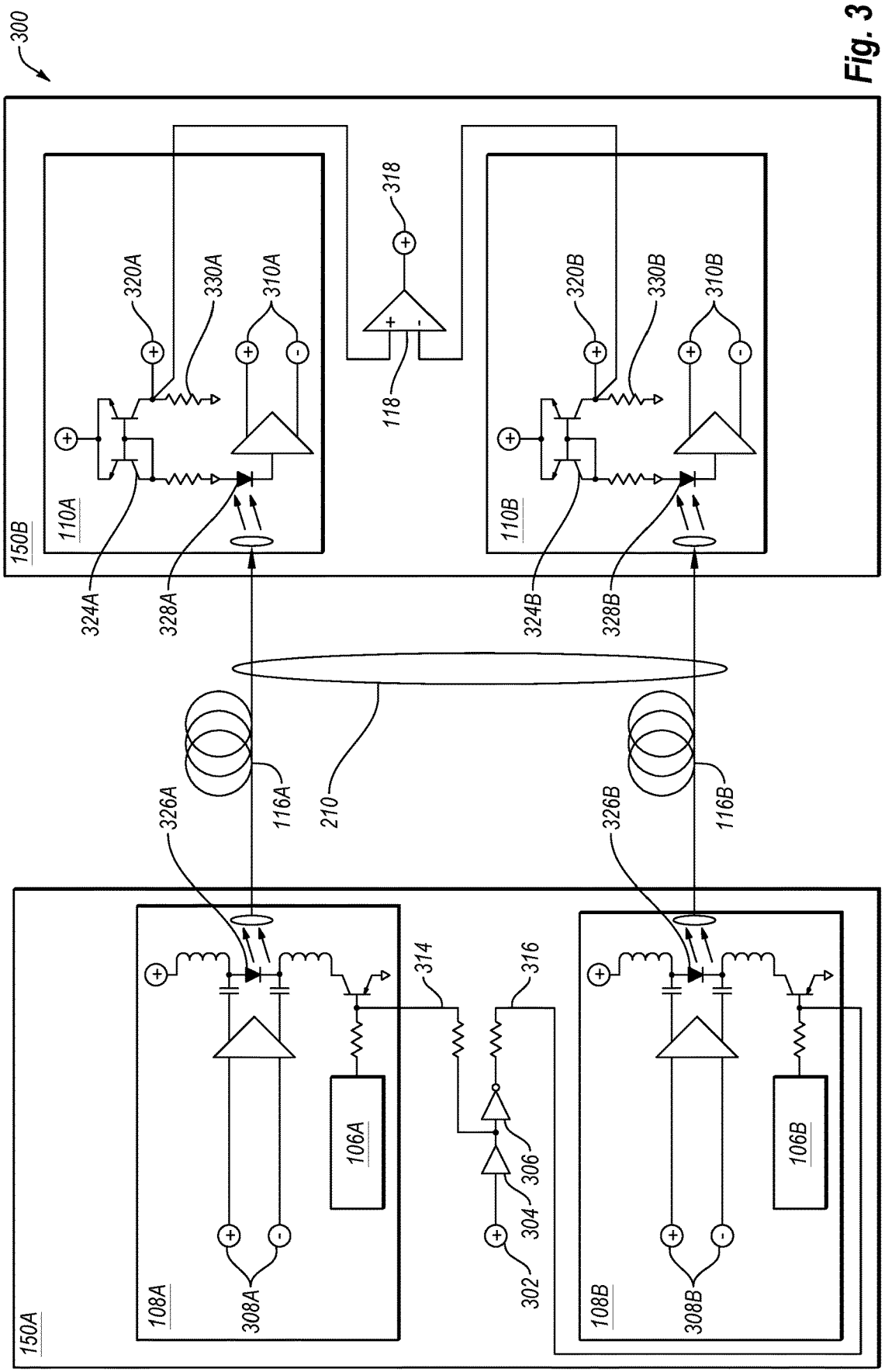
FIG. 3 illustrates an example differential out-of-band (OOB) channel that may implement the optoelectronic module of FIG. 1.

FIG. 3 illustrates an example differential OOB channel (differential channel) 300 that may be implemented in the active cable 200 of FIG. 2, for example. FIG. 3 depicts multiple components and/or items (e.g., 150, 106, 108, 116, 118, and 110) already described with reference to FIGS. 1 and 2. Some details of these components are not repeated with respect to FIG. 3. Specifically, the differential channel 300 depicts communication of OOB data and payload data from a first optoelectronic module 150A to a second optoelectronic module 150B, both of which are examples of the optoelectronic modules 150 illustrated in and described with respect to FIGS. 1 and 2. Between the first optoelectronic module 150A and the second optoelectronic module 150B the differential channel 300 includes the differential pair 210 of the first and second optical channels 116A and 116B. With reference to FIG. 3, a first lane includes the first optical source 108A (which is an example of the optical sources 108 of FIG. 1), the first optical channel 116A, and a first optical receiver 110A (which is an example of the optical receivers 110 of FIG. 1), and a second lane includes the second optical source 108B (which is another example of the optical sources 108 of FIG. 1), the second optical channel 116B, and a second optical receiver 110B (which is another example of the optical receivers 110 of FIG. 1). A first optical signal is communicated along the first lane and a second optical signal is communicated along the second optical lane. A first lane payload data is extracted from the first optical signal, a second lane payload data is extracted from the second optical signal, and OOB data is extracted from the optical power differences between the first and second optical signals.

Specifically, the first and second optical sources 108A and 108B may receive OOB data at an OOB transmit data input 302. The OOB data may include logical bits, for instance, represented in an electrical signal. A buffer 304 and an inverter 306 may modify the OOB data before the OOB data is communicated to the control devices 106A and 106B. A first OOB modulation 314 may be communicated to a first control device 106A and a second OOB modulation 316 may be communicated to a second control device 106B. The first OOB modulation 314 and the second OOB modulation 316 may include opposite polarities.

Additionally, the optical sources 108 may receive payload data at payload data inputs 308A, 308B (collectively payload data inputs 308). The first lane payload data is communicated to a first optical transmitter 326A and the second lane payload data is communicated to a second optical transmitter 326B. The first and second control devices 106A and 106B may generate average bias currents based on the bias variations of the first or second optical transmitters 326A or 326B coupled thereto used to produce a desired average optical output power. The OOB modulations 314 and 316 are summed with the average bias to vary the average optical powers of optical signals generated by the optical transmitters 326. For example, a first bias current may hold the optical power of the first optical signal generated by the first optical transmitter 326A high while a second bias current may hold the optical power of the second optical signal generated by the second optical transmitter 326B low, and/or vice versa. The payload data represented in the first and second optical signals is not affected by optical power changes imposed by changing the bias current of the first and second optical transmitters 326A and 326B. The OOB data may be represented by differences in optical power between the first and second optical signals.

The optical signals are communicated via the optical channels 116 to the first and second optical receivers 110A and 110B. The first optical receiver 110A receives the first optical signal generated by the first optical transmitter 326A, and the second optical receiver 110B receives the second optical signal generated by the second optical transmitter 326B. The first optical receiver 110A extracts the first lane payload data included in the first optical signal. The first lane payload data is communicated to a first lane payload data output 310A. Likewise, the second optical receiver 110B extracts the second lane payload data included in the second optical signal. The second lane payload data is communicated to a second lane payload data output 310B.

First and second current mirrors 324A and 324B communicate signals representative of the average optical powers of the first and second optical signals to the sensing system (depicted in FIG. 3 as a comparator) 118. The sensing system 118 outputs the OOB data at an OOB data output 318.

In this and other differential channels, there may be differences between actual received powers at the optical receivers 110 that exceed the OOB modulation levels. Accordingly, in some embodiments, the optical average received power electrical signal may be normalized to facilitate the comparison of OOB modulation levels between the channels. To normalize the electrical representation of the average optical powers presented to the sensing system 118, the values of sensing resistors 330A and/or 330B may be changed. Positive voltage sources 320A and 320B may be connected to each of receiver diodes 328A and 328B through the driving branch of the first and second current mirrors 324A and 324B. The output side of each of the first and second current mirrors 324A and 324B may accordingly source a current in proportion to an average current generated by the receiver diodes 328A and 328B. A voltage across the sensing resistors 330A and 330B develops according to Ohm's Law. Inputs to the sensing system 118 may be connected to the sensing resistors 330A and 330B. Therefore, the sensing system 118 compares the difference between two voltages, each voltage being defined by the current proportional to the respective average received power of each lane, multiplied by the value of the sensing resistors 330A and 330B. Other embodiments may normalize the apparent average received optical powers by other means.

In some embodiments, the sensing resistors 330A and 330B may be altered, which alter the actual gain of the first and second current mirrors 324A and 324B so that the various received powers are normalized multiplicatively. In these and other embodiments, the sensing resistors 330A and 330B may include a resistive DAC device.

Additionally, in some embodiments, values of the sensing resistors 330A and 330B may be initially determined during manufacturing and/or changed as needed. To determine the value of each of the sensing resistors 330A and 330B, the first and second optical transmitters 326A and 326B may be operated at normal optical power output while coupled to their respective optical receivers 110A and 110B. A voltage is measured that is proportional to average received power. When the measured voltage is different from a target voltage, the value of corresponding sensing resistors 330A and/or 330B is modified. For example, when the voltage measured in step 2 is above the target voltage, the value of the sensing resistors 330A and/or 330B is decreased. The value of the sensing resistors 330A and/or 330B is modified until the voltage measured is sufficiently close to the target voltage. The resulting value of the sensing resistors 330A and/or 330B may be stored in non-volatile memory for later use.

As depicted in FIG. 3, the first optoelectronic module 150A includes only the optical sources 108 and the second optoelectronic module 150B includes only the optical receivers 110. In some alternative embodiments, the first optoelectronic module 150A may additionally include some optical receivers 110 and/or the second optoelectronic module 150B may additionally include some optical sources 108, which may enable communication of additional OOB data and/or payload data from the second optoelectronic module 150B to the first optoelectronic module 150A. Additionally or alternatively, the first optoelectronic module 150A may include more than two optical sources 108 and the second optoelectronic module 150B may include more than two optical receivers 110. The additional optical sources 108 and/or the optical receivers 110 may enable communication of additional OOB signals from the first optoelectronic module 150A to the second optoelectronic module 150B. The first and second optoelectronic modules 150A and 150B and the differential pairs 210 may be included in one or more devices or ends of an active cable as depicted in FIG. 1 and FIG. 2, respectively.

Figure 4A:
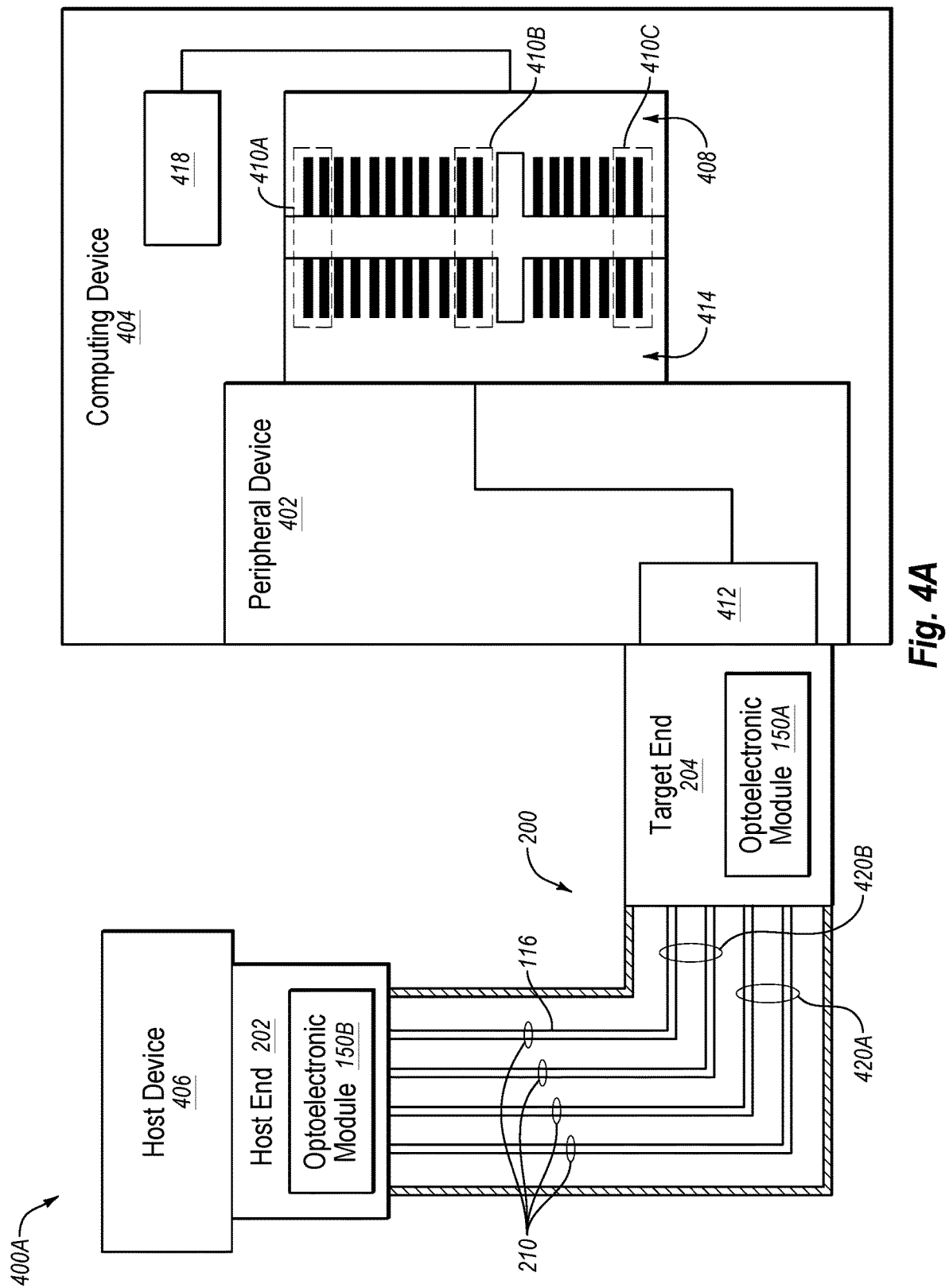
FIGS. 4A and 4B illustrate example PCIe systems in which the optoelectronic module of FIG. 1 may be implemented.
Figure 4B:
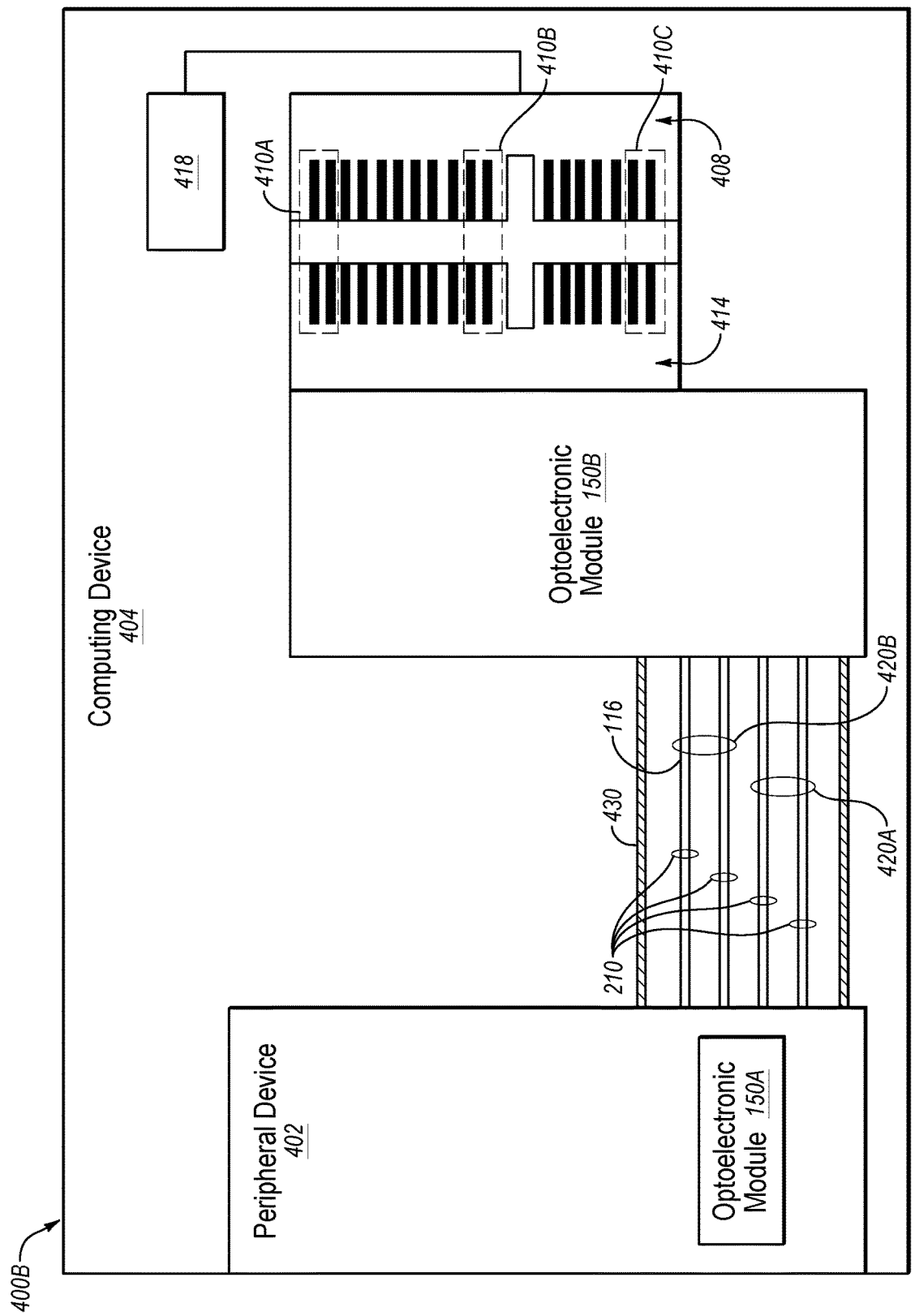

FIGS. 4A and 4B illustrate example PCIe systems 400A and 400B in which the first and second optoelectronic modules 150A and 150B, which are examples of the optoelectronic module 150 of FIG. 1, may be implemented. In a first PCIe system 400A of FIG. 4A, the active cable 200 described with reference to FIG. 2 may be configured to communicate payload signals and OOB signals (collectively, data signals) between a host device 406 and a computing device 404. In a second PCIe system 400B of FIG. 4B, a peripheral device 402 may be communicatively coupled to the computing device 404 such that data signals may be communicated therebetween.

Referring to FIGS. 4A and 4B, the computing device 404 may include one or more buses 408 that substantially comply with the PCIe standard. Accordingly, the peripheral device 402 configured to be implemented with the computing device 404 may also substantially comply with the PCIe standard. The active cable 200 and/or the peripheral device 402 may be configured to communicate the payload data signals on lanes 410A-410C (hereinafter lane 410 or lanes 410) designated in the PCIe standard to receive the payload data and OOB data on the lanes 410 designated in the PCIe standard to receive status and/or operational data. Accordingly, the active cable 200 and/or the peripheral device 402 may include connectors such as the connectors 212 of FIG. 2 configured to communicate the OOB signals along one or more of the lanes 410 designated in the PCIe standard to receive status and/or operational data and to communicate the payload signals along one or more of the lanes 410 designated in the PCIe standard to receive payload data.

Moreover, the active cable 200 and/or the peripheral device 402 may be configured to communicate the OOB data in both directions. Specifically, with reference to FIG. 4A, the OOB data may be communicated from the host device 406 to the computing device 404 and from the computing device 404 to the host device 406. Likewise in FIG. 4B, the OOB data may be communicated from the peripheral device 402 to the computing device 404 and from the computing device 404 to the peripheral device 402. In both FIGS. 4A and 4B, the OOB data may be communicated in both directions simultaneously. Additionally, the OOB data may be communicated on the optical channels 116 simultaneously with the payload data.

For example, the lanes 410 may include sets of related lanes 410. Each set of the related lanes 410 may be configured to communicate four lanes of payload data. In the first PCIe system 400A, for example, a set of lanes 410 may be configured to communicate four lanes of payload data between the computing device 404 (an "upstream" device) and the host device 406 (a "downstream" device) via the peripheral device 402. Likewise, in the second PCIe system 400B, the set of lanes 410 may be configured to communicate four lanes of payload data between the computing device 404 (an "upstream" device) and the peripheral device 402 (a "downstream" device). Additionally, two status signals that originate in the host device 406 may be communicated to the computing device 404 or to the peripheral device 402 (or vice versa). Accordingly, the active cable 200 in FIG. 4A or a communicative coupling 430 between the peripheral device 402 and a device side bus 414 in FIG. 4B may include eight optical channels 116 (one of which is labeled in FIGS. 4A and 4B at 116). The eight optical channels 116 may be optical fibers in this and other embodiments. A first four optical channels 420A of the eight optical channels 116 may communicate the payload data. Additionally, the first four optical channels 420A may be divided into two differential pairs 210 with respect to OOB data. The two differential pairs 210 of the first four optical channels 420A may communicate two logical bits of status information. Likewise, a second four optical channels 420B of the eight optical channels 116 may communicate the payload data. Additionally, the second four optical channels 420B may be divided into two differential pairs 210 with respect to OOB data that may communicate two logical bits of status information. The first and second optoelectronic modules 150A and 150B may each include four optical sources and four optical receivers configured to communicate the payload data and OOB data. In some embodiments, according to the PCIe standard, the bus 408 may include one or more PRSNT# lanes 410A and 410C and one or more WAKE# lanes 410B. Generally, the PRSNT# lanes 410A and 410C and the WAKE# lane 410B are configured to communicate status signals between the computing device 404 and the peripheral device 402, which may be further communicated to the host device 406 in the embodiment of FIG. 4A. The active cable 200 and/or the communicative coupling 430 may thus be configured to communicate OOB signals via the PRSNT# lanes 410A and 410C and WAKE# lane 410B.

Specifically, in the first PCIe system 400A, the target end 204 of the active cable 200 may be configured to connect with a connector 412 of the peripheral device 402. The connector 412 may receive electrical signals representative of the OOB data which may be communicated to the PRSNT# lanes 410A and 410C and the WAKE# lane 410B of the device side bus 414. The electrical signals representative of the OOB may be communicated to the PRSNT# lanes 410A and 410C and the WAKE# lane 410B of the bus 408. The electrical signals may then be communicated from the bus 408 to a sub-system 418 of the computing device 404. Additionally, the sub-system 418 may generate or otherwise receive operational data. Electrical signals representing the operational data may be communicated to the bus 408. The electrical signals may be communicated to the PRSNT# lanes 410A and 410C and the WAKE# lane 410B of the bus 408 then to the PRSNT# lanes 410A and 410C and the WAKE# lane 410B of the device side bus 414. The electrical signals may then be communicated to the target end 204 via the connector 412. The second optoelectronic module 150B may generate optical signals (e.g., optical signals 112 of FIGS. 1 and 2) including optical power differences representative of the electrical signals. The OOB data may be communicated to the host end 202. The host end 202 may also include the first optoelectronic module 150A that converts the OOB data to electrical signals representative of the operational data generated by the sub-system 418. The electrical signals may be communicated to the host device 406.

Additionally, in the second PCIe system 400B, the second optoelectronic module 150B may be coupled to the device side bus 414. The second optoelectronic module 150B may receive electrical signals representative of the OOB data from the peripheral device 402. The electrical signals representative of the OOB data may be communicated to the PRSNT# lanes 410A and 410C and the WAKE# lane 410B of the device side bus 414. The electrical signals representative of the OOB data may be communicated to the PRSNT# lanes 410A and 410C and the WAKE# lane 410B of the bus 408. The electrical signals may then be communicated from the bus 408 to the sub-system 418 of the computing device 404. Additionally, the sub-system 418 may generate or otherwise receive operational data. Electrical signals representing the operational data may be communicated to the bus 408. The electrical signals may be communicated to the PRSNT# lanes 410A and 410C and the WAKE# lane 410B of the bus 408 then to the PRSNT# lanes 410A and 410C and the WAKE# lane 410B of the device side bus 414. The electrical signals may then be communicated to the second optoelectronic module 150B. The second optoelectronic module 150B may generate optical signals (e.g., optical signals 112 of FIGS. 1 and 2) including optical power differences representative of the electrical signals. The OOB data may be communicated to the first optoelectronic module 150A at the peripheral device 402. The second optoelectronic module 150B may convert the OOB data to electrical signals representative of the operational data generated by the sub-system 418. The electrical signals may be communicated to the peripheral device 402.

In some embodiments, the active cable 200 may only include the optoelectronic module (e.g., 150A or 150B) at the target end 204 or at the host end 202. In these and other embodiments, the host device 406 or the peripheral device 402 may include the optoelectronic module. Moreover, one or more of the ends 202 and/or 204 may be integrated with the host device 406 and/or the peripheral device 402.

The first and second PCIe systems 400A and 400B generally depict an x1 PCIe configuration. However, some other embodiments may be configured to be coupled with a PCIe board formatted according to an x4, an x8, or an x16 configuration or any other variation of the PCIe standard. Furthermore, the PCIe standard is only an example of a bus standard according to which the active cable 200 and/or the peripheral device 402 may be configured. For example, in the first PCIe system 400A or the second PCIe system 400B, the active cable 200 and/or the peripheral device 402 may substantially conform to another PCI standard, another serial computer expansion bus standard, or another standard device interface. For instance, in some alternative embodiments (CXP in at least some embodiments), the active cable 200 may include ten or twelve optical channels 116 inbound and ten or twelve more outbound. In these and other embodiments, one of the differential pairs 210 may be configured to communicate synchronous clock and data. Thus, in embodiments including multiple optical channels 116 there may be one clock differential pair 210 and multiple OOB data differential pairs 210 synchronous to the common clock signal communicated via the clock differential pair 210.

While the above describes implementations including eight, ten, and twelve optical channels 116, some embodiments may include two or more optical channels without limitation. Furthermore, some embodiments may include two or more optical channels communicating data (OOB data and/or payload data) in a first direction and/or two or more optical channels communicating data in a second direction opposite the first direction. A number communicating data in the first direction may not necessarily be equivalent to the number communicating data in the second direction.

Figure 5:
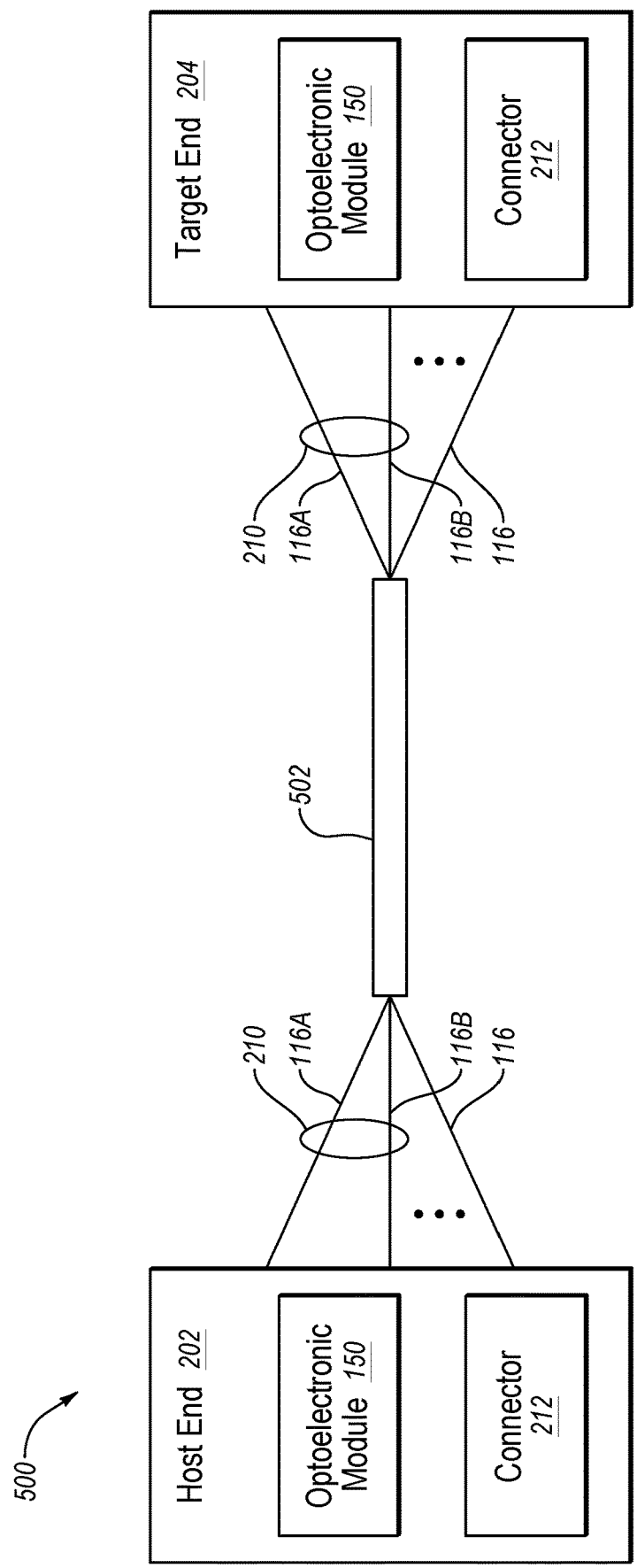
FIG. 5 illustrates a block diagram of an example multi-fiber active (MFA) cable implementing the optoelectronic module of FIG. 1.

FIG. 5 illustrates a block diagram of an example multi-fiber active (MFA) cable 500 implementing the optoelectronic modules 150 of FIG. 1. The MFA cable 500 is similar to the active cable 200 described with reference to FIG. 2. Accordingly, the MFA cable 500 includes some components (e.g., 202, 204, 210, and 212) of the active cable 200 and some details of these components are not repeated with respect to FIG. 5.

Generally, the MFA cable 500 may be configured to connect to a host device and a target device such that payload data and the OOB data may be communicated therebetween. Specifically, the MFA cable 500 may enable communication of the payload data and the OOB data from the host device to the target device and from the target device to the host device. The MFA cable 500 may be configured to communicate the payload data and the OOB data simultaneously between the host end 202 and the target end 204 via multiple optical signals carried on multiple independent fibers included in a multi-fiber (MF) link 502. One of the optoelectronic modules 150 may be included at each of the ends 202 and 204, each of which may be configured to generate, communicate, and receive the payload data signals and/or the OOB signals.

In the MFA cable 500, each of the optoelectronic modules 150 may include multiple optical sources (e.g., the optical sources 108 of FIG. 1), each of which may be configured to generate one of the optical signals. Two or more of the optical sources may be configured to generate optical signals in a differential signal pair with respect to OOB data. The optical powers of one or both of the optical signals may be varied to represent OOB data.

In the MFA cable 500, each of the optical channels 116 may include one of the optical fibers included in the MF link 502. The differential pair 210, which may include the first and second optical channels 116A and 116B, may be designated as a differential pair on which the OOB data are communicated. The differential OOB data may be transmitted on the differential pair 210 along with the payload data from the host end 202 to the target end 204 via the MF link 502.

Optical receivers (e.g., the optical receivers 110 of FIG. 1) included in one or both of the optoelectronic modules 150 may be configured to receive the multiple signals communicated via the MF link 502. Two of the optical receivers may be configured to receive the differential optical signals. As discussed above, a comparator (e.g., the sensing system 118 of FIG. 1) may detect optical power differences between the differential optical signals and interpret the optical power differences as OOB data.

FIG. 5 depicts the MFA cable 500 including one of the optoelectronic modules 150 at each of the ends 202, 204. Additionally or alternatively, one or more of the optoelectronic modules 150 that generate the multiple optical signals including the OOB data may instead be implemented in a device such as a host device and/or a target device discussed above. Additionally or alternatively, the MFA cable 500 may be implemented in a system such as the first and second PCIe systems 400A and 400B of FIGS. 4A and 4B. The MFA cable 500 implemented in the first and second PCIe systems 400A and 400B of FIGS. 4A and 4B may include one or more connectors 212 configured to communicate the optical signals to lanes, etc. as designated in the PCIe or another standard.

Figure 6:
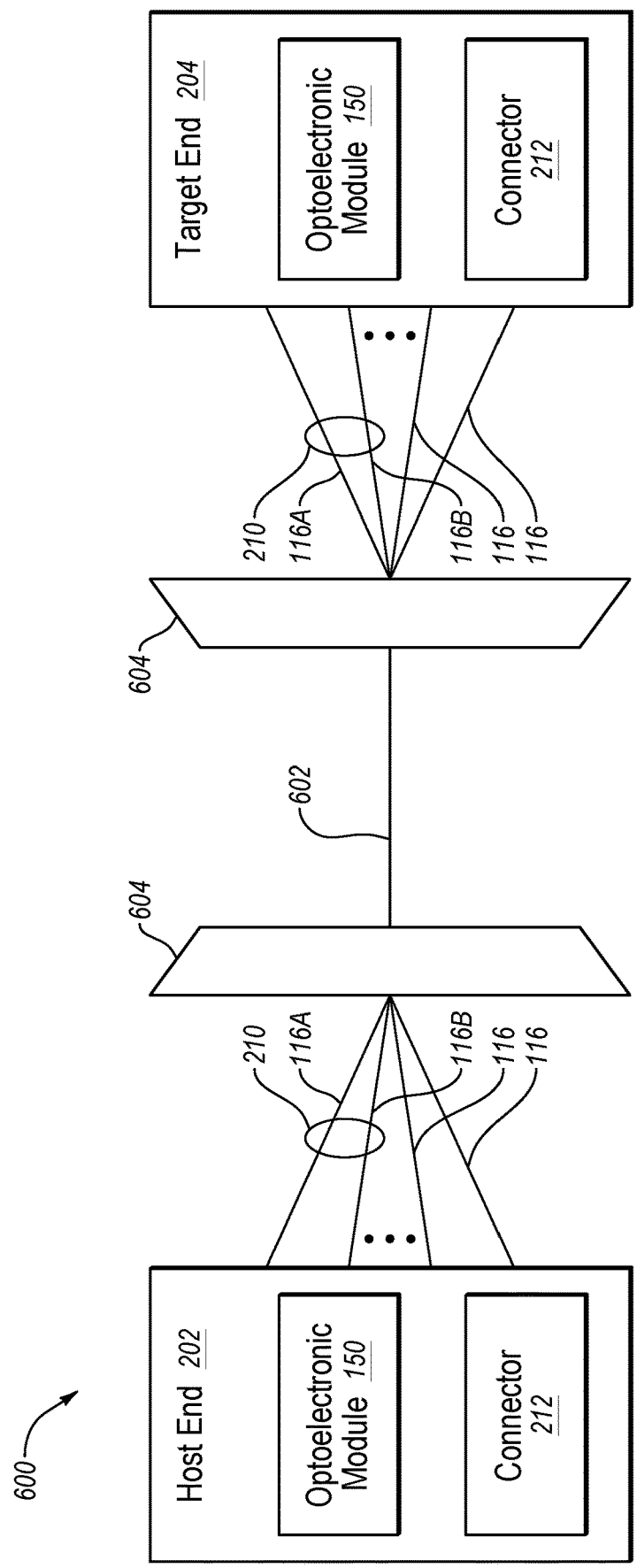
FIG. 6 illustrates a block diagram of an example wavelength-division multiplexing (WDM) cable implementing the optoelectronic module of FIG. 1.

FIG. 6 illustrates a block diagram of an example wavelength-division multiplexing (WDM) cable 600 implementing the optoelectronic modules 150 of FIG. 1. The WDM cable 600 is similar to the active cable 200 described with reference to FIG. 2. Accordingly, the WDM cable 600 includes some components (e.g., 202, 204, 210, and 212) of the active cable 200 and some details of these components are not repeated with respect to FIG. 6.

Generally, the WDM cable 600 may be configured to connect to a host device and a target device such that payload data and the OOB data may be communicated therebetween. The WDM cable 600 may be further configured to communicate the payload data and the OOB data simultaneously between the host end 202 and the target end 204 via a WDM signal. One of the optoelectronic modules 150 may be included at each of the ends 202 and 204, which may be configured to generate, communicate, and receive the payload data signals and/or the OOB signals.

The WDM signal in each direction (e.g., the host end 202 to the target end 204 and/or vice versa) may include multiple data-carrying optical signals having differing wavelengths that may be communicated along a fiber 602. In some embodiments, the fiber 602 may include a single mode fiber (SMF) 602. In some embodiments, the fiber 602 may include a multimode fiber (MMF). For example, these and other embodiments may include a short wave, multimode, WDM qSFP+ that implements one or more vertical cavity surface-emitting lasers (VCSELs), which may be spaced in the band between about 800 nanometers (nm) and 950 nm. Four channels of data-carrying optical signals maybe communicated on the MMF, in each direction (e.g., the host end 202 to the target end 204 and/or vice versa).

The multiple data-carrying optical signals are combined at a transmitting side (e.g., the host end 202 or the target end 204) using a multiplexer/demultiplexer 604 and separated at a receiving side (e.g., the other of the host end 202 or the target end 204) via another multiplexer/demultiplexer 604.

The multiplexer/demultiplexer 604 in FIG. 6 is shown as a single component. However, in some embodiments, the multiplexer/demultiplexer 604 may include one or more separate or substantially separate components having differing structures. For instance, the multiplexer/demultiplexer 604 at a transmitting side may be referred to as a multiplexer, and the multiplexer/demultiplexer 604 at a receiving side may be referred to as a demultiplexer. The multiplexer/demultiplexer 604 may include an individual multiplexer, an individual demultiplexer, or a combination thereof. In some embodiments, the multiplexer may include a non-wavelength selective combiner. Additionally or alternatively, the demultiplexer may include a separate wavelength bandpass filter for each wavelength at each receiver channel's individual detector.

In the WDM cable 600, each of the optoelectronic modules 150 may include multiple optical sources (e.g., the optical sources 108 of FIG. 1), each of which may be configured to generate an optical signal having a specific wavelength. Two or more of the optical sources may be configured to generate optical signals for differential optical signals including the OOB data. Specifically, the optical powers of one or both of the OOB signals may be varied to represent OOB data.

The differential pair 210, which may include the first and second optical channels 116A and 116B, may be designated as a differential pair on which the OOB data are communicated. The differential OOB signals may be transmitted on the differential pair 210, multiplexed with one or more other optical signals, and communicated via the fiber 602 to the other multiplexer/demultiplexer 604.

Optical receivers (e.g., the optical receivers 110 of FIG. 1) may be configured to receive the optical signals separated by the multiplexer/demultiplexer 604. Two of the optical receivers may be configured to receive the differential OOB data. As discussed above, a comparator (e.g., the sensing system 118 of FIG. 1) may detect optical power differences between the differential OOB signals and interpret the optical power differences as OOB data.

FIG. 6 depicts the WDM cable 600 including one of the optoelectronic modules 150 at each of the ends 202, 204. However, the optoelectronic module 150 that generates a WDM signal including OOB data may additionally or alternatively be implemented in a device such as a host device and/or a target device. Additionally or alternatively, the WDM cable 600 may be implemented in a system such as the first and second PCIe systems 400A and 400B of FIGS. 4A and 4B. The WDM cable 600 implemented in the first and second PCIe systems 400A and 400B of FIGS. 4A and 4B may include one or more connectors 212 configured to communicate the OOB signals to lanes, etc. as designated in the PCIe or another standard.

Figure 7:
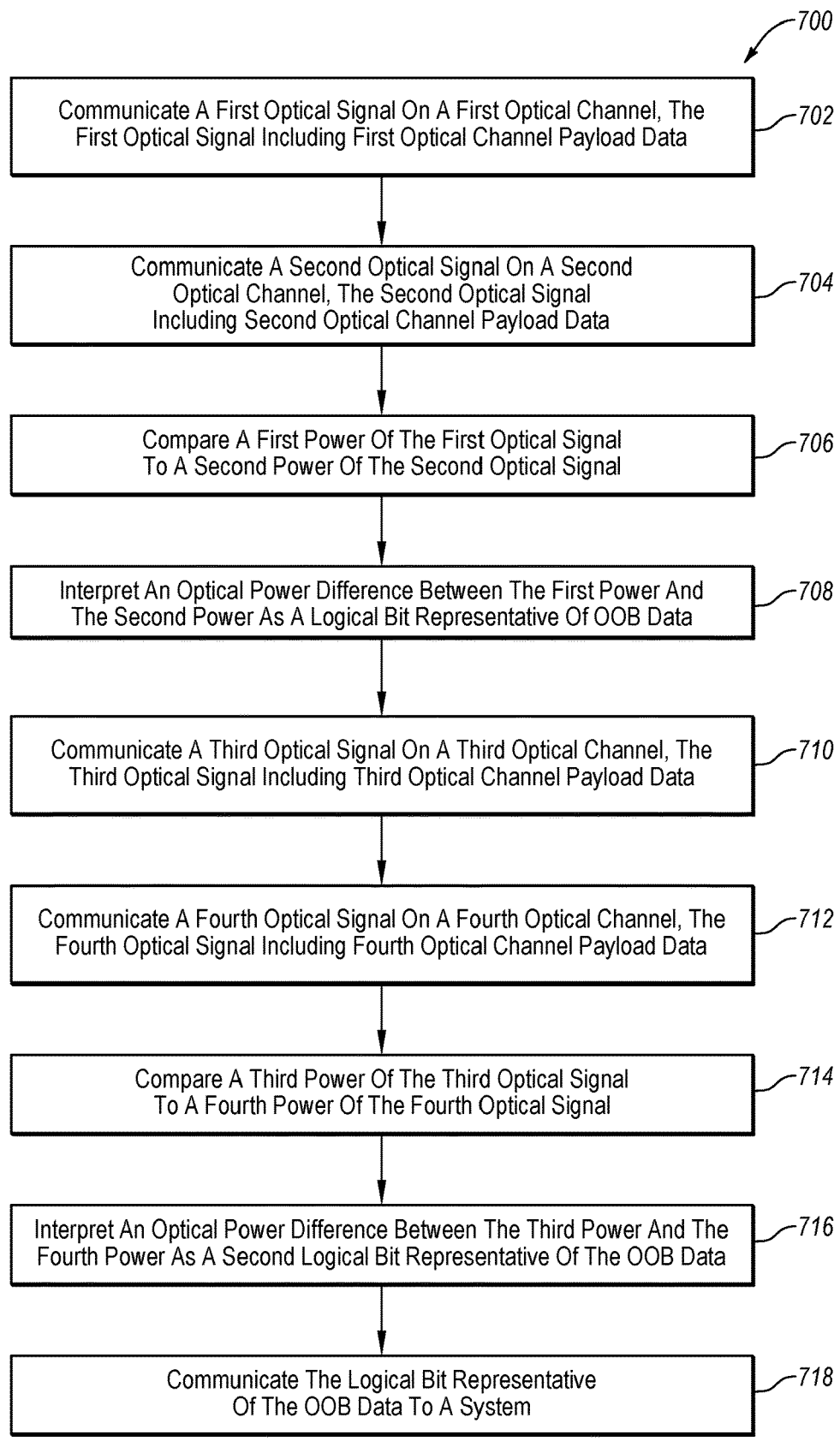
FIG. 7 is a flowchart illustrating an example method of communicating an optical OOB signal between a host device and a target device.

FIG. 7 is a flowchart of an example method 700 of communicating an optical OOB signal between a host device and a target device. In some embodiments, the method 700 may be performed by the optoelectronic module 150 discussed herein. Although illustrated as discrete blocks, various blocks may be divided into additional blocks, combined into fewer blocks, or eliminated, depending on the desired implementation.

The method 700 may begin at block 702. At block 702 a first optical signal may be communicated. The first optical signal may be communicated on a first optical channel. The first optical signal may include a first optical channel payload data. In some embodiments, the first optical channel may be included in a differential pair of optical channels. At block 704, a second optical signal may be communicated. The second optical signal may be communicated on a second optical channel. The second optical signal may include a second optical channel payload data. The second optical channel may be included in the differential pair.

At block 706, a first power of the first optical signal may be compared to a second power of the second optical signal. At block 708, an optical power difference between the first power and the second power may be interpreted as a logical bit representative of OOB data. At block 710, a third optical signal may be communicated. The third optical signal may be communicated on a third optical channel. The third optical signal may include third optical channel payload data. In some embodiments, the third optical channel may be included in a second differential pair of optical channels. At block 712, a fourth optical signal may be communicated. The fourth optical signal may be communicated on a fourth optical channel. The fourth optical signal may include fourth optical channel payload data. In some embodiments, the fourth optical signal may be included of the second differential pair.

At block 714, a third power of the third optical signal may be compared to a fourth power of the fourth optical signal. At block 716, an optical power difference between the third power and the fourth power may be interpreted as a second logical bit representative of the OOB data.

In some embodiments, the first power and the second power may be variable. In these and other embodiments, in response to the first power being greater than the second power, the method 700 may include interpreting the optical power difference as a logical one bit. Additionally, in response to the second power being greater than the first power, the method 700 may include interpreting the optical power difference as a logical zero bit.

In some embodiments, the first optical signal includes a reference signal that may have a substantially constant power. In these and other embodiments, in response to the first power being greater than the second power, the method 700 may include interpreting the optical power difference as a logical one bit. Additionally, in response to the second power being greater than the first power, the method 700 may include interpreting the optical power difference as a logical zero bit.

At block 718, the logical bit representative of the OOB data may be communicated to a system. In some embodiments, the system may include an optical system. The optical system may be configured to substantially comply with one or more of a qSFP standard, a CXP standard, or a CFP standard. In some embodiments, the system may include a serial computer expansion bus. For example, the OOB data may be communicated to one or more lanes on the serial computer expansion bus. In some embodiments, the serial computer expansion bus substantially may comply with the PCIe bus standard. In these and other embodiments, the logical bits interpreted from the optical power difference between the first power and the second power may be communicated on a PRSNT# lane. Additionally, the logical bits interpreted from the optical power difference between the third power and the fourth power may be communicated on a WAKE# lane.

Additionally, in some embodiments, the first optical channel may include a first wavelength of a WDM optical signal and the second optical channel may include a second wavelength of the WDM optical signal. Alternatively, the first optical channel may include a first fiber of a MF link and the second optical channel may include a second fiber of the MF link.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 8:
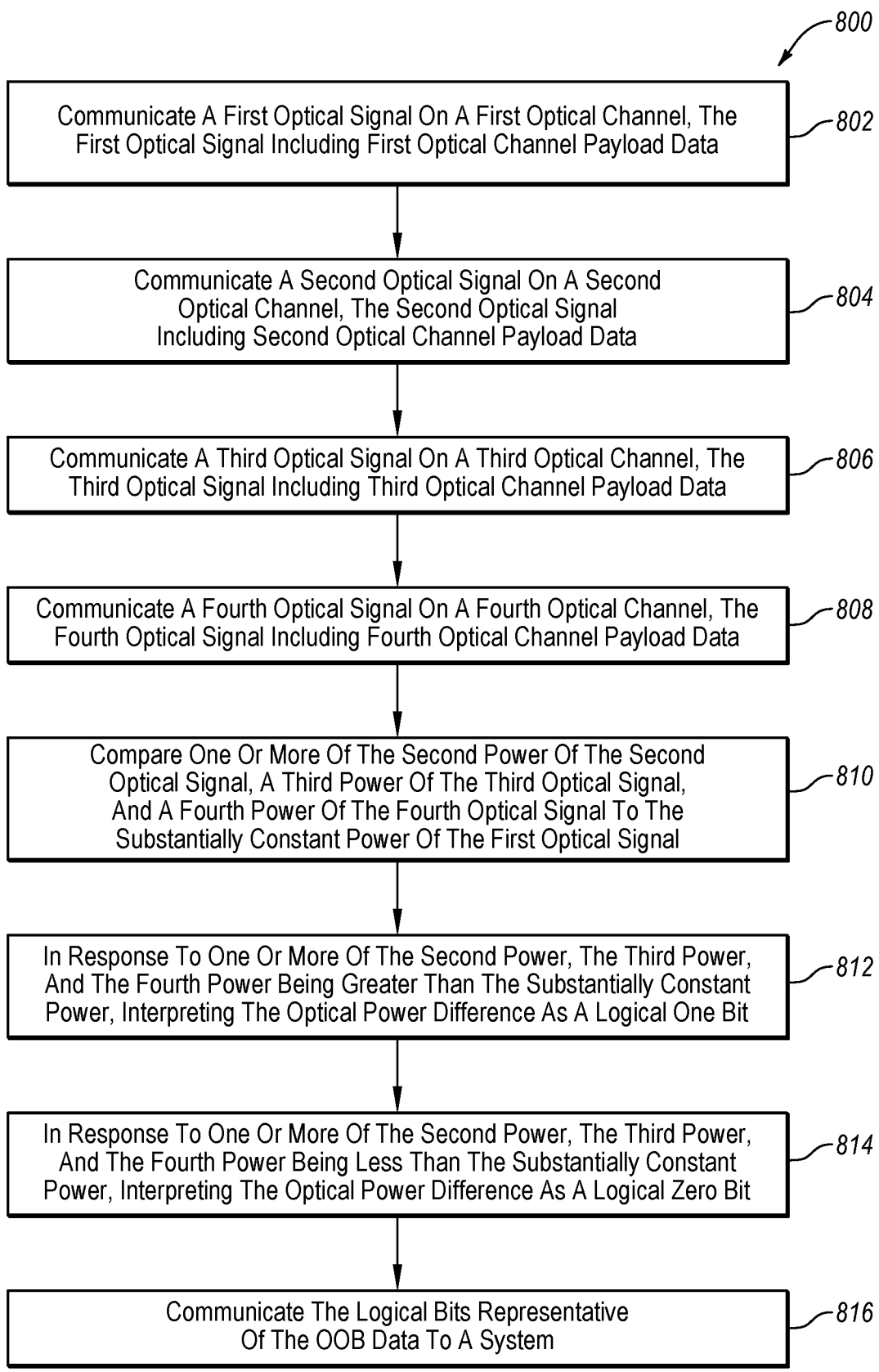
FIG. 8 is a flowchart illustrating another example method of communicating an optical OOB signal between a host device and a target device.

FIG. 8 is a flowchart of another example method 800 of communicating an optical OOB signal between a host device and a target device. In some embodiments, the method 800 may be performed by the optoelectronic module 150 discussed herein. Although illustrated as discrete blocks, various blocks may be divided into additional blocks, combined into fewer blocks, or eliminated, depending on the desired implementation.

The method 800 may begin at block 802. At block 802, a first optical signal may be communicated. The first optical signal may be communicated on a first optical channel. The first optical signal may include a first optical channel payload data. At block 804, a second optical signal may be communicated. The second optical signal may be communicated on a second optical channel. The second optical signal may include a second optical channel payload data. At block 806, a third optical signal may be communicated. The third optical signal may be communicated on a third optical channel. The third optical signal may include third optical channel payload data. At block 808, a fourth optical signal may be communicated. The fourth optical signal may be communicated on a fourth optical channel. The fourth optical signal may include fourth optical channel payload data.

At block 810, one or more of the second power of the second optical signal, a third power of the third optical signal, and a fourth power of the fourth optical signal may be compared to a substantially constant power of the first optical signal. At block 812, in response to one or more of the second power, the third power, and the fourth power being greater than the substantially constant power, the optical power difference may be interpreted as a logical one bit. At block 814, in response to one or more of the second power, the third power, and the fourth power being less than the substantially constant power, the optical power difference may be interpreted as a logical zero bit.

At block 816, the logical bit representative of the OOB data may be communicated to a system. In some embodiments, the system may include an optical system. The optical system may be configured to substantially comply with one or more of a qSFP standard, a CXP standard, or a CFP standard. In some embodiments, the system may include a serial computer expansion bus. For example, the OOB data may be communicated to one or more lanes on the serial computer expansion bus. In some embodiments, the serial computer expansion bus substantially may comply with the PCIe bus standard. In these and other embodiments, the logical bits interpreted from the optical power difference between the first power and the second power may be communicated on a PRSNT# lane. Additionally, the logical bits interpreted from the optical power difference between the third power and the fourth power may be communicated on a WAKE# lane.

Additionally, in some embodiments, the first optical channel may include a first wavelength of a WDM optical signal and the second optical channel may include a second wavelength of the WDM optical signal. Alternatively, the first optical channel may include a first fiber of a MF link and the second optical channel may include a second fiber of the MF link.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may comprise non-transitory computer-readable storage media including RAM, ROM, EEPROM, CD-ROM or other optical disk storage, magnetic disk storage or other magnetic storage devices, or any other non-transitory storage medium which may be used to carry or store desired program code means in the form of computer-executable instructions or data structures and which may be accessed by a general-purpose or special-purpose computer. Combinations of the above should also be included within the scope of computer-readable media.

Computer-executable instructions comprise, for example, instructions and data which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. An optoelectronic module comprising:
a first optical transmitter configured to generate a first optical signal including first payload data on a first optical channel, the first optical signal including a first optical power having a substantially constant average power;
a second optical transmitter configured to generate a second optical signal including second payload data on a second optical channel, the second optical signal including a second optical power having a varying average power; and
an optical power control device configured to control the second optical transmitter relative to the first optical transmitter for transmission of out-of-band (OOB) data as an OOB differential signal via the first optical channel and the second optical channel, the OOB differential signal including a first bit of the OOB data that is represented by the second optical power of the second optical signal being greater than the first optical power of the first optical signal and a second bit of the OOB data that is represented by the second optical power of the second optical signal being less than the first optical power of the first optical signal.

2. The optoelectronic module of claim 1, wherein:
the second optical transmitter includes a laser or a light-emitting diode (LED);
the optical power control device includes a modulator; and
the modulator is configured to modulate the second optical power of the second optical signal transmitted by the laser or the LED.

3. The optoelectronic module of claim 1, wherein:
the first optical channel is a reference signal, and
the optical power control device is configured to vary the second optical power the second optical signal.

4. The optoelectronic module of claim 1, further comprising:
a third optical transmitter configured to generate a third optical signal including third channel payload data on a third optical channel; and
a fourth optical transmitter configured to generate a fourth optical signal including fourth channel payload data on a fourth optical channel,
wherein:
the first optical channels is a reference signal, and
the optical power control device is configured to vary the second optical power of the second optical signal, a third optical power of the third optical signal, and a fourth optical power of the fourth optical signal to create average optical power differences between one or more of the first optical signal and the second optical signal, the first optical signal and the third optical signal, or the first optical signal and the fourth optical signal.

5. The optoelectronic module of claim 4, wherein the optical power control device is configured to control the third optical transmitter and the fourth optical transmitter relative to the first optical transmitter for transmission of the OOB data as an OOB differential signal via the first optical channel and the third optical channel, and as an OOB differential signal via the first optical channel and the fourth optical channel.

6. The optoelectronic module of claim 4, wherein the first, the second, the third, and the fourth channels correspond to lanes on a serial computer expansion bus.

7. The optoelectronic module of claim 6, wherein the OOB data interpreted from the optical power difference between the first power and the second power are communicated on a PRSNT# lane of the serial computer expansion bus or a WAKE# lane of the serial computer expansion bus.

8. The optoelectronic module of claim 1, wherein the optical power control device is configured to vary current to the second optical transmitter.

9. The optoelectronic module of claim 8, wherein the optical power control device includes a bias current driver configured to vary bias current to the second optical transmitter.

10. The optoelectronic module of claim 1, wherein:
amplitudes of the first channel payload data and the second channel payload data are greater than an amplitude an optical power difference representative of the first bit of the OOB data;
frequencies of the second channel payload data are greater than a frequency of an optical power difference representative of the first bit of the OOB data;
the optical power control device is configured to change the second optical power of the second optical transmitter about 10%; or
the optical power control device is configured to control one or more changes to the second optical power of the second optical transmitter according to a slew of between about 100 nanoseconds and about 500 nanoseconds.

11. The optoelectronic module of claim 1, wherein:
the first optical signal includes a first wavelength of a wavelength-division multiplexing (WDM) signal and the second optical signal includes a second wavelength of the WDM signal; or
the first optical transmitter is configured to communicate the first optical signal to a first fiber of a multi-fiber (MF) link and the second optical transmitter is configured to communicate the second optical signal to a second fiber of the MF link.

12. An active optical cable including the optoelectronic module of claim 1.

13. A method of communicating an optical out-of-band (OOB) signal between a host device and a target device, the method comprising:
communicating a first optical signal on a first optical channel, the first optical signal including first optical channel payload data and including a first optical power having a substantially constant average power;
communicating a second optical signal on a second optical channel, the second optical signal including second optical channel payload data, the second optical channel being independent of the first optical channel and including a second optical power having a varying average power;
comparing the first optical power of the first optical signal to the second optical power of the second optical signal;
interpreting a first optical power difference in which the second optical power of the second optical signal is greater than the first optical power of the first optical signal as a first bit of OOB data; and
interpreting a second optical power difference in which the second optical power of the second optical signal is less than the first optical power of the first optical signal as a second bit of OOB data.

14. The method of claim 13, further comprising:
communicating a third optical signal on a third optical channel, the third optical signal including third optical channel payload data and a third optical power having a varying average power;
communicating a fourth optical signal on a fourth optical channel, the fourth optical signal including fourth optical channel payload data and a fourth optical power having a varying average power;
comparing the first power of the first optical signal to a third power of the third optical signal;
comparing the first power of the first optical signal to a fourth power of the fourth optical signal;
interpreting a second optical power difference between the first power and the third power as a third bit of OOB data; and
interpreting a third optical power difference between the first power and the fourth power as a fourth bit of OOB data.

15. The method of claim 13, further comprising communicating the first bit of the OOB data and the second bit of OOB data to an optical system.

16. The method of claim 13, further comprising communicating the first bit and the second bit of the OOB data to one or more lanes on a serial computer expansion bus.

17. The method of claim 16, wherein:
the first bit of the OOB data is communicated on a PRSNT# lane of serial computer expansion bus; and
the second bit of the OOB data is communicated on a WAKE# lane of serial computer expansion bus.

18. The method of claim 17, wherein:
the first optical channel includes a first wavelength of a wavelength-division multiplexing (WDM) optical signal and the second optical channel includes a second wavelength of the WDM optical signal; or
the first optical channel includes a first fiber of a multi-fiber (MF) link and the second optical channel includes a second fiber of the MF link.

19. The method of claim 13, wherein:
amplitudes of the first channel payload data and the second channel payload data are greater than an amplitude an optical power difference representative of the first bit of the OOB data;
frequencies of the second channel payload data are greater than a frequency of an optical power difference representative of the first bit of the OOB data;
the second optical power of the second optical transmitter is configured to change by about 10%; or
the second optical power of the second optical transmitter is configured to change according to a slew of between about 100 nanoseconds and about 500 nanoseconds.

* * * * *